(No Model.)
A. M. ALLEN.
VEHICLE WHEEL.
No. 516,149. Patented Mar. 6, 1894.
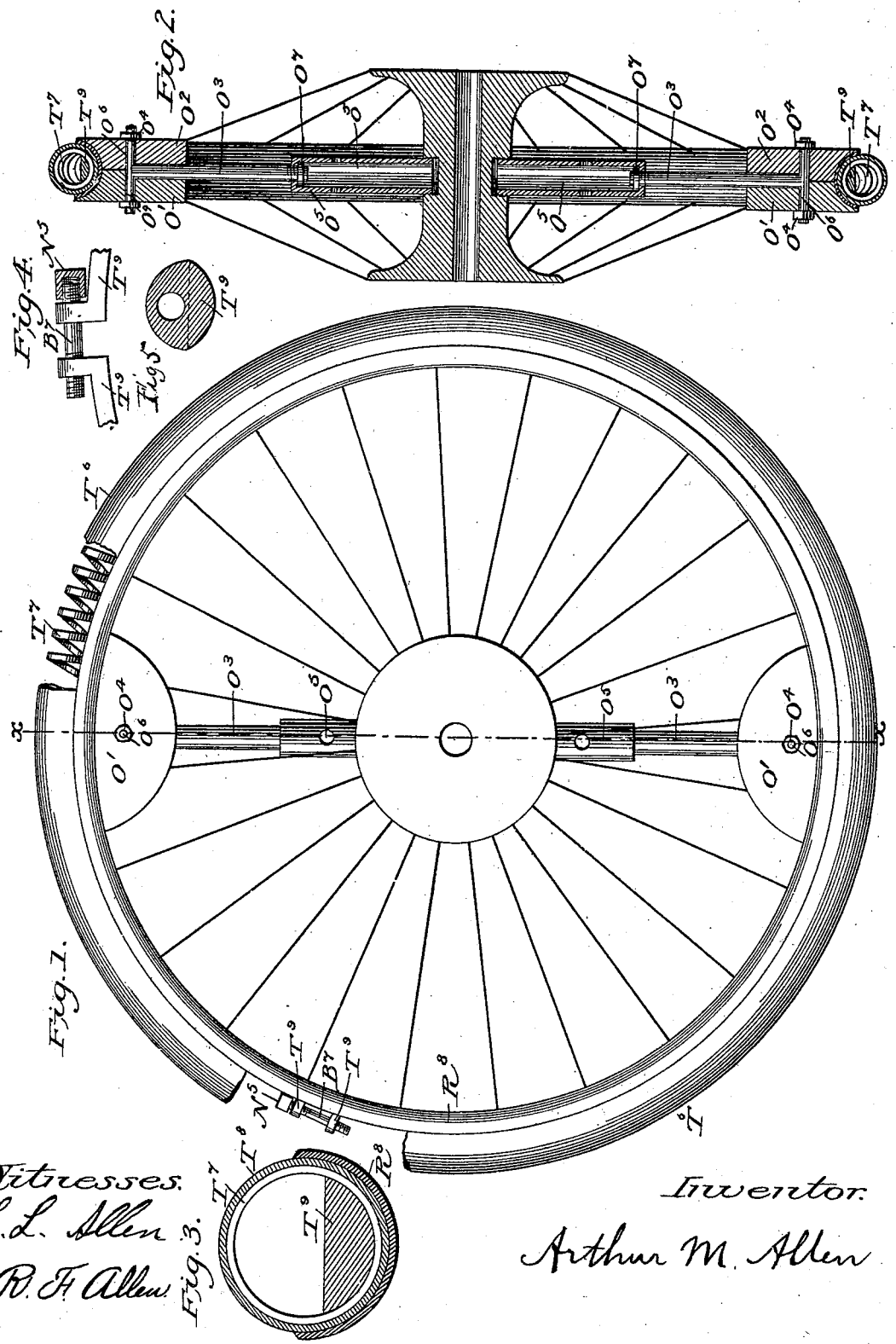
Witnesses.
L. L. Allen
R. F. Allen
Inventor.
Arthur M. Allen

UNITED STATES PATENT OFFICE.

ARTHUR M. ALLEN, OF WEST NEW BRIGHTON, NEW YORK.

VEHICLE-WHEEL.

SPECIFICATION forming part of Letters Patent No. 516,149, dated March 6, 1894.

Original application filed November 7, 1884, Serial No. 147,340. Divided and this application filed July 18, 1893. Serial No. 480,868. (No model.)

*To all whom it may concern:*

Be it known that I, ARTHUR M. ALLEN, a citizen of the United States, and a resident of West New Brighton, in the county of Richmond and State of New York, have invented certain new and useful Improvements in Wheels, of which the following is a specification.

The invention in this case, consists of a new and improved vehicle wheel and tire, which are shown and described, but not claimed in my application, Serial No. 147,340, filed November 7, 1884, of which this application is a division, and relates to the means for producing momentum with minimum dead weight, and special safeguards, and also to economy of power and construction; also to such a construction of an elastic tire as may serve instead of frame springs in vehicles, the whole being hereinafter set forth in detail and being illustrated in the accompanying drawings in which—

Figure 1 represents a side elevation. Fig. 2 is a vertical section on the line $x\ x$ Fig. 1. Figs. 3, 4, and 5 comprise detail views of parts.

Similar letters indicate corresponding parts.

The wheel W is loaded near its rim $R^8$. at two opposite points, which are connected to each other, and to the hub by braces $O^3$, to preserve the circular form of the wheel at high speed. The weights O are in this case made in two halves $O'\ O^2$, with recesses inside (to fit the sides of the spoke ends, and the rim $R^8$), and transverse holes for the brace head $O^6$ which by nuts $O^4$, secure the weights on the rim, and to each other. The brace heads are forged to (or passed through holes in) the ends of braces $O^3$, each of which is a rod having on its outer end a cross rod or brace heads $O^6$, and on its inner end a lock nut $O^7$, and a cap $O^5$ sliding on the rod, and threaded on its lower outside edge, to enter a threaded hole in the hub. Transverse holes in the caps $O^5$ allow a rod to be used as a wrench to screw up the caps and adjust the strain on the braces. The weights in action describe cycloidal paths through the air, the upper one at twice the speed of the vehicle, while the lower one is for the moment at rest. Each weight in turn is like a stone from a sling, and the full benefit of momentum is realized. These weights also may be cast into hollow rims, or made integral therewith as metal sections of the fellies in a wooden wheel. The braces are necessary to resist the eccentric and elliptical strains which the weights make on the wheel at high speed. The eccentric strain necessitates their being secured to the hub and not directly to each other as they might be, by straps passing the sides of the hub. The weights in a crude form, appear in my Patent No. 103,957, granted June 7, 1870. Those shown and described here with the braces in addition are the results after much use of the former, the braces being an essential feature of the improvement. The rim $R^8$ is guttered and therein is a hollow spring tire $T^6$ continuous or in sections. In this case such tire is formed of a spiral metal spring $T^7$ covered with tubing $T^8$ of rubber, leather, or other tough material, and is secured to the rim $R^8$ by a strap $T^9$, a right and left bolt $B^9$ and lock nut $N^5$ see Fig. 4. It will be seen that the strap $T^9$ is convex upon its inner side and fits into the trough shaped rim. Between this strap and the rim, is clamped the spiral $T^7$, leaving the upper half of the spiral free, thus forming a series of arched springs, transverse to the plane of the wheel. The spiral need not be a single continuous spring, as a series of single arches or sections would answer as well. It will also be seen that the strap may clamp both the springs and cover to the rim. The shape of the tire is not essential but circular is the best. The strap $T^9$, spring $T^7$ and cover $T^8$ are assembled bent around the rim, one end of the cover turned back, the spring united, the bolt $B^9$ set up by a flat wrench inserted between the spring coils and the cover ends fastened together by cementing or sewing. The cover may be in sections or strapped spirally from a narrow flat piece; whereby more surface contact on the road is obtained and yet less road friction produced, and a vehicle is enabled to use sandy, muddy or rough roads without slipping, clogging or serious hinderance, and other springs are not needed.

What I claim as new, and desire to secure by Letters Patent, is—

1. A wheel provided with weights at two opposite points near its rim and braces connected to said weights, substantially as described.

2. A wheel provided with weights at two opposite points near its rim, braces connected to said weights, and means to adjust the tension of said braces.

3. A wheel provided with weights at two opposite points near its rim, said weights being composed of two similar parts and secured upon the rim and spokes substantially as described, and with braces connecting said weights to the hub.

4. In a road wheel, half weights $O'$ $O^2$, and other half weights $O'$ $O^2$ secured to the wheel at opposite points near its rim by bolts $O^6$ and nuts $O^7$ as shown.

5. The combination in a wheel of braces $O^3$ half weights $O'$ $O^2$ screw caps $O^5$ cross bolts $O^6$ nuts $O^7$ and lock nuts $O^4$ as shown.

6. In a road wheel a series of arched springs arranged transversely upon its rim, and provided with a detachable cover, and means to secure all in position.

7. A road wheel, in which a continuous spring coiled in a spiral form serves for a tread, a detachable cover for said tread and means to secure it in position.

8. A road wheel whose tire is formed of a continuous spring coiled in a spiral form made of wire, flat on one side with the flat side out, and provided with a detachable cover and also with means to maintain all in position.

9. In a road wheel, a continuous spring coiled in a spiral form and tubular detachable cover in combination with the wheel rim and a strap passing around the rim inside of the spring, and provided with connections for the strap ends.

10. A road wheel provided with a tire formed of a series of arched springs secured transversely upon the rim by an adjustable strap passing around the rim inside of the springs, and with connections for the strap ends.

11. A road wheel provided with a tire formed of a continuous spring coiled in a spiral form and secured to the rim by an adjustable strap passing around the rim inside of the spring, and with connections for the strap ends.

12. A road wheel provided with a tire formed of wire flat on one side, twisted into spiral form with the flat side out, and secured to the rim by an adjustable strap passing around the rim inside of the spiral, and also with connections for the strap ends.

13. In a road wheel, a flat continuous spring coiled in a spiral form and a tubular cover in combination with a rim and means to secure them thereto.

14. Road wheel W spiral spring $T^7$, cover $T^8$, strap $T^9$, bolt $B^9$, and locknut $N^5$, all in combination as shown.

Signed at West New Brighton, in the county of Richmond and State of New York, this 2d day of June, A. D. 1893.

ARTHUR M. ALLEN.

Witnesses:
JOHN DE MORGAN,
WM. P. FRENCH.